Patented Feb. 21, 1939

2,147,702

UNITED STATES PATENT OFFICE 2,147,702

COMPOSITION OF MATTER AND USE OF SAME IN PREPARATION OF CELLULOSIC ARTICLES

Gilman S. Hooper, Waynesboro, Va., assignor to E. I. du Pont de Nemours & Company, Wilmington, Del., a corporation of Delaware No Drawing. Application July 24, 1936, Serial No. 92,468

16 Claims. (Cl. 106—40)

The present invention relates to certain new compositions of matter, more particularly, it relates to certain new compounds of the 1-hydroxyl, 3-keto propane series, such as, for example, butyl acetonyl carbinol. These compounds are characterized in that the hydroxylated carbon is separated from the ketonic carbon by one unsubstituted methylene group, and in which the hydroxylated carbon is joined to an aryl or aralkyl group, or to an alkyl group having at least two carbon atoms. In its specific aspects, the invention relates to the use of these new compositions of matter, as well as similar compounds, such as, methyl acetonyl carbinol, in which the hydroxylated carbon is joined to an alkyl group having only one carbon atom, as softening or swelling agents for cellulose derivative compositions.

It is an object of the present invention to provide certain new compounds which have particular utility as softening or swelling agents in organic acid cellulose derivative compositions.

It is another object of this invention to provide a softening or swelling agent for a cellulose derivative composition which shall be relatively water-soluble and have a substantially high-boiling point.

It is a further object of this invention to produce an improved cellulose derivative composition which will have a wide range of application.

It is a more specific object of this invention to provide a flexible cellulose derivative thread containing an improved softening or swelling agent which is relatively water-soluble and has a substantially high-boiling point.

Other objects of the invention will appear hereinafter.

The object of the invention may be achieved, in general, by synthesizing new compounds of the type which may be represented by the formula:

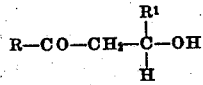

wherein R and R¹ represent aryl or aralkyl groups, or alkyl groups having at least two carbon atoms. Any compound represented by the above formula, as well as compounds in which R and R₁ represent alkyl groups with only one carbon atom, may be incorporated in a cellulose derivative composition and various products such as plastics, wrapping tissue, photographic film, artificial silk or the like formed therefrom, or, in the case of certain articles, such as, artificial silk, the compound may be applied thereto after the formation thereof.

The invention will be described with particular reference to the use of the new compounds as softening or swelling agents for cellulose acetate, it being understood, however, that the invention in its broad aspect contemplates the use of these compounds as softening or swelling agents in cellulose derivative compositions generally. As examples of other cellulose derivatives to which the new compounds may be applied as softening or swelling agents, may be mentioned the following esters: cellulose propionate, cellulose aceto propionate, cellulose acetostearate; and the following ethers: ethyl cellulose, methyl cellulose, butyl cellulose and benzyl cellulose. The particular high-boiling, water-soluble compound which will have the desired softening or swelling action on any particular cellulose derivative may be easily determined by anyone skilled in the art.

In order to more clearly set forth the invention, reference is made to the following specific examples disclosing the details of the invention. It is to be understood, however, that the invention is not to be limited by the details set forth in these examples:

*Example I*

Equimolecular quantities of acetone and acetaldehyde are dissolved in water and reacted for a short period in the presence of potassium carbonate. After neutralization, the methyl acetonyl carbinol (CH₃—COCH₂—CHOHCH₃) having a boiling point of 176–177° C. is distilled off under reduced pressure from the mixture. It is substantially a non-solvent for cellulose acetate but does exert a pronounced swelling action on cellulose acetate.

15–20% of methyl acetonyl carbinol, based on the weight of the finished yarn, is added to an acetone spinning solution containing 20% of cellulose acetate and is mixed until uniformly distributed throughout the solution. The modified spinning solution is filtered and then converted by standard dry spinning methods into a 150 denier thread containing 50 filaments. Substantially all the high-boiling swelling agents remain in the resulting thread which is unusually flexible and pliant. The flexibility of the thread permits use thereof in knitting fabrics having a very close construction; for example, 50–70 courses per inch, without exhibiting distortions or irregularity in the knitted fabric. Threads, containing methyl acetonyl carbinol, are furthermore suitable for the production of all kinds of closely woven fabrics in which the thread is drawn around sharp corners and bends during production wherein it is desirable that the threads offer little resistance to being bent rapidly. After the fabrication operation, the methyl acetonyl carbinol is removed by subjecting the fabric to an aqueous treatment which may advantageously be in the form of a dye bath. By removal of the methyl acetonyl carbinol, the fabric regains its elasticity and is thereby materially improved in its resistance to permanent deformation resulting from stretching or creasing.

Example II

Equimolecular quantities of acetone and propioaldehyde are dissolved in water and reacted for a short period in the presence of potassium carbonate. After neutralization of the potassium carbonate, the ethyl acetonyl carbinol ($CH_3COCH_2$—$CHC_2H_5OH$) is distilled off under reduced pressure from the mixture. It is a swelling agent for cellulose acetate and may be substituted for methyl acetonyl carbinol in Example I with good results.

Example III

Equimolecular quantities of methyl ethyl ketone and acetaldehyde are dissolved in water and reacted for a short period in the presence of potassium carbonate. After neutralization of the potassium carbonate, the 2-hydroxy-4-keto hexane or 1-hydroxy-1-methyl-3-keto-3-ethyl-propane ($C_2H_5$—$COCH_2$—$CHOHCH_3$) is distilled off under reduced pressure from the mixture. The 1-hydroxy-3-keto substituted compound is a swelling agent for cellulose acetate and may be employed in Example I in place of methyl acetonyl carbinol to produce a cellulose acetate thread which is suitable for knitting.

While ethyl acetonyl carbinol, 2-hydroxy 4-keto hexane, and particularly methyl acetonyl carbinol are preferred for the purpose of modifying the flexibility of cellulose acetate threads, the other relatively high-boiling compounds of the present invention may also be employed with advantage, provided proper adjustments are made for the volatility, water-solubility, and swelling action of the particular compound selected. As other 1-hydroxyl, 3-keto, propane derivatives of the invention suitable under proper conditions as modifiers for cellulose compositions may be mentioned, propyl acetonyl carbinol; butyl acetonyl carbinol; benzyl acetonyl carbinol; phenyl acetonyl carbinol; 2-hydroxy, 4-keto heptane; 2-hydroxy, 4-keto octane; 3-hydroxy, 5-keto, 5-phenyl pentane; 1-benzyl, 1-hydroxyl, 3-keto hexane; 1-phenyl, 1-hydroxyl, 3-keto pentane, and the like.

While acetone has been specified as the volatile solvent of the spinning solution, it will be recognized by those skilled in the art that almost any of the customary volatile solvents for cellulose acetate may be substituted therefor, if desired. Thus, methyl acetate, dioxane, or mixtures of ethyl alcohol and benzene, ethyl alcohol and acetone, or acetone and water may be employed instead of acetone.

The amount of 1-hydroxyl, 3-keto propane derivative to be added to the spinning solution may be varied within wide limits, depending largely upon the degree of flexibility desired for the resulting article, and the plasticizing action of the particular compound chosen. Generally, it has been found that 5% to 25% and up to 30%, or more, based on the weight of the finished yarn, of the compound gives excellent results.

Instead of introducing the compound into the spinning solution, the compound may, if desired, be applied in whole or in part to the finished yarn to increase the flexibility thereof. In this latter mode of application, the propane derivatives of the invention are probably diluted to a sufficient extent that the threads do not dissolve appreciably or become noticeably tacky.

The following example, which is not to be considered as limitative of the invention, illustrates this mode of operation:

Example IV

10%, based on the weight of the finished yarn, of methyl acetonyl carbinol is added and thoroughly distributed throughout an acetone spinning solution containing 25% of cellulose acetate. Threads spun from this solution in a heated evaporative cell are treated with the following yarn dressing composition:

| Constituents— | Parts by weight |
|---|---|
| Methyl acetonyl carbinol | 15 |
| Glycerin | 25 |
| Sulfonated animal or vegetable oil | 25 |
| Triethanolamine | 1 |
| Water | 23 |
| Dextrin | 2 |
| Soap | 1 |

This dressing composition is preferably applied to cellulose acetate threads by passing them over a roller which rotates in the composition in such a fashion and at such a peripheral speed with respect to the linear speed of the thread that the amount of dressing uniformly applied is about 10–30% of the weight of the thread. The resulting thread may be satisfactorily and uniformly knitted into a circular knit fabric having 60 courses per inch without substantial degradation of the yarn.

It will, of course, be recognized by those skilled in the art that the cellulose acetate thread may also be treated additionally with other finishing agents regardless of the mode of application of the 1-hydroxyl 3-keto substituted propane. As typical examples of customary finishing agents may be mentioned olive oil, castor oil, cottonseed oil, soya bean oil, peanut oil, teaseed oil, and animal, vegetable, or mineral oils and the like. The oils may be employed in an oxidized form, if desired. Likewise, water and a hygroscopic relatively non-volatile substance such as ethylene glycol, glycerin, diethylene glycol, propylene glycol, and like polyhydric alcohols or ether derivatives thereof may be applied to cellulose acetate yarn in conjunction with the 1-hydroxyl 3-keto propane derivatives of the invention.

While the new 1-hydroxyl 3-keto substituted propanes of the invention are especially valuable in modifying the flexibility of cellulose acetate thread, it will, of course, be recognized that the compounds also may be applied to advantage in other arts, such as plastics, wrapping tissue, photographic film, varnishes, coatings, and the like. Thus cellulose acetate sheets and films modified with the compounds of the invention exhibit a greatly improved flexibility which is substantially permanent due to the relatively low volatility of these compounds. Such softened sheets and films find valuable application as interlayers in the manufacture of laminated glass. In plastic arts, cellulose acetate compositions containing these compounds may be used in the preparation of toilet ware, novelties, rods, tubes, etc.

In coating compositions and lacquers, the modified cellulose acetate compositions of the invention may be mixed with other materials such as damar, ester gum, polyhydric alcohol-polybasic acid resins, polyvinyl acetate resins, polymerized methyl methacrylate resins, phenolaldehyde resins, and like natural and synthetic resins, as well as pigments, powdered metals, rubber, and fillers.

The following advantages illustrate the utility of the invention. In the first place, the 1-hydroxyl 3-keto substituted propanes are all swelling agents for cellulose acetate so that they may be incorporated therein to give compatible compositions which find a great variety of valuable applications. Thus, in the thread art, the fact that compounds have a relatively elevated boiling point insures that the quantity of the compound in the thread and consequently the capacity of the thread to be bent rapidly and sharply is substantially predetermined and equivalent to the amount of the compound added to the spinning solution. This advantage is of considerable importance since in the production of closely knit fabrics the thread is drawn around small turns and sharp corners at a fast rate and the lack of pliability of unmodified cellulose acetate thread has given rise to objectionable distortions and irregularity in the stitch formation and cutting or breaking of the filaments of the thread, as well as defects known in the art as "pin-holes" and "bird-eyes". Unmodified cellulose acetate threads taken from knitted fabrics both before and after finishing have exhibited severely degraded tenacity and elongation characteristics, and stress-strain curves of threads removed from unfinished fabric which is knit from cellulose acetate thread at 55 courses per inch have shown very material yarn degradation. Furthermore, this yarn degradation becomes rapidly more pronounced when the unmodified cellulose acetate yarn is subjected to knitting at a slightly higher stitch count. The essential non-volatility and stability of the compounds of the invention, together with the fact that in the preferred embodiment they are mostly held within the interstices of the thread, assure that the modified threads may be stored for a long period of time without losing their enhanced flexibility and pliability. Finally, the compounds are readily removable since they may be extracted easily with a water bath to give the finished fabric a highly desirable elasticity and resistance to deformation.

Obviously many changes and modifications can be made in the above detailed description without departing from the nature and spirit of the invention. The invention, therefore, is not to be limited except as set forth in the appended claims.

I claim:

1. A composition composed of a cellulose derivative of an organic acid, said composition containing, as a plasticizer therefor, a compound having the formula,

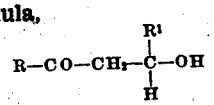

in which R and R¹ represent a substituent taken from the group consisting of aryl, aralkyl, and alkyl groups.

2. A composition composed of a cellulose derivative of an organic acid, said composition containing, as a plasticizer therefor, methyl acetonyl carbinol.

3. A composition composed of a cellulose derivative of an organic acid, said composition containing, as a plasticizer therefor, 2-hydroxy, 4-keto hexane.

4. A composition composed of a cellulose derivative of an organic acid, said composition containing, as a plasticizer therefor, ethyl acetonyl carbinol.

5. A cellulose acetate composition containing, as a plasticizer therefor, a compound having the formula,

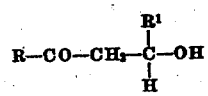

in which R and R¹ represent a substituent taken from the group consisting of aryl, aralkyl, and alkyl groups.

6. A cellulose acetate composition containing, as a plasticizer therefor, methyl acetonyl carbinol.

7. A cellulose acetate composition containing, as the plasticizer therefor, 2-hydroxy, 4-keto hexane.

8. A cellulose acetate composition containing, as a plasticizer therefor, ethyl acetonyl carbinol.

9. A thread composed of a cellulose derivative of an organic acid, said thread containing, as a plasticizer therefor, a compound having the formula,

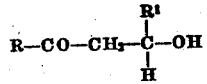

in which R and R¹ represent a substituent taken from the group consisting of aryl, aralkyl, and alkyl groups in an amount sufficient to impart to said threads a substantial degree of flexibility and pliability.

10. A thread composed of a cellulose derivative of an organic acid, said thread containing, as a plasticizer therefor, methyl acetonyl carbinol in an amount sufficient to impart to said threads a substantial degree of flexibility and pliability.

11. A thread composed of a cellulose derivative of an organic acid, said thread containing, as a plasticizer therefor, 2-hydroxy, 4-keto hexane in an amount sufficient to impart to said threads a substantial degree of flexibility and pliability.

12. A thread composed of a cellulose derivative of an organic acid, said thread containing, as a plasticizer therefor, ethyl acetonyl carbinol in an amount sufficient to impart to said threads a substantial degree of flexibility and pliability.

13. A thread composed of cellulose acetate containing, as a plasticizer therefor, a compound having the formula,

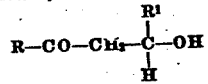

in which R and R¹ represent a substituent taken from the group consisting of aryl, aralkyl, and alkyl groups in an amount sufficient to impart to said threads a substantial degree of flexibility and pliability.

14. A thread composed of cellulose acetate containing, as a plasticizer therefor, methyl acetonyl carbinol in an amount sufficient to impart to said threads a substantial degree of flexibility and pliability.

15. A thread composed of cellulose acetate containing, as a plasticizer therefor, 2-hydroxy, 4-keto hexane in an amount sufficient to impart to said threads a substantial degree of flexibility and pliability.

16. A thread composed of cellulose acetate containing, as a plasticizer therefor, ethyl acetonyl carbinol in an amount sufficient to impart to said threads a substantial degree of flexibility and pliability.

GILMAN S. HOOPER.